Aug. 25, 1925.
P. E. PEARCE
1,551,327
BOLL WEEVIL EXTERMINATOR
Filed March 5, 1924
3 Sheets—Sheet 1
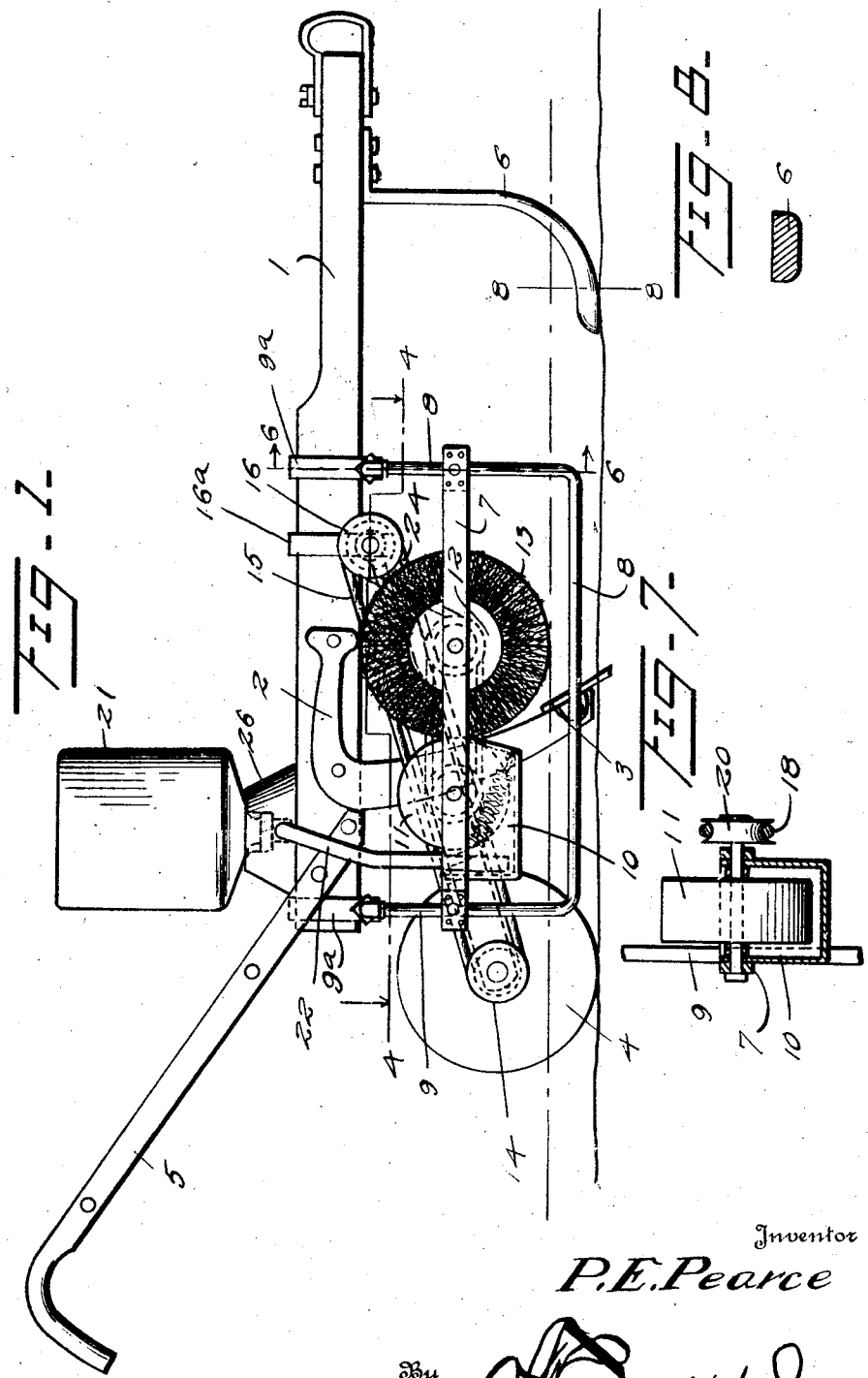
Inventor
P. E. Pearce

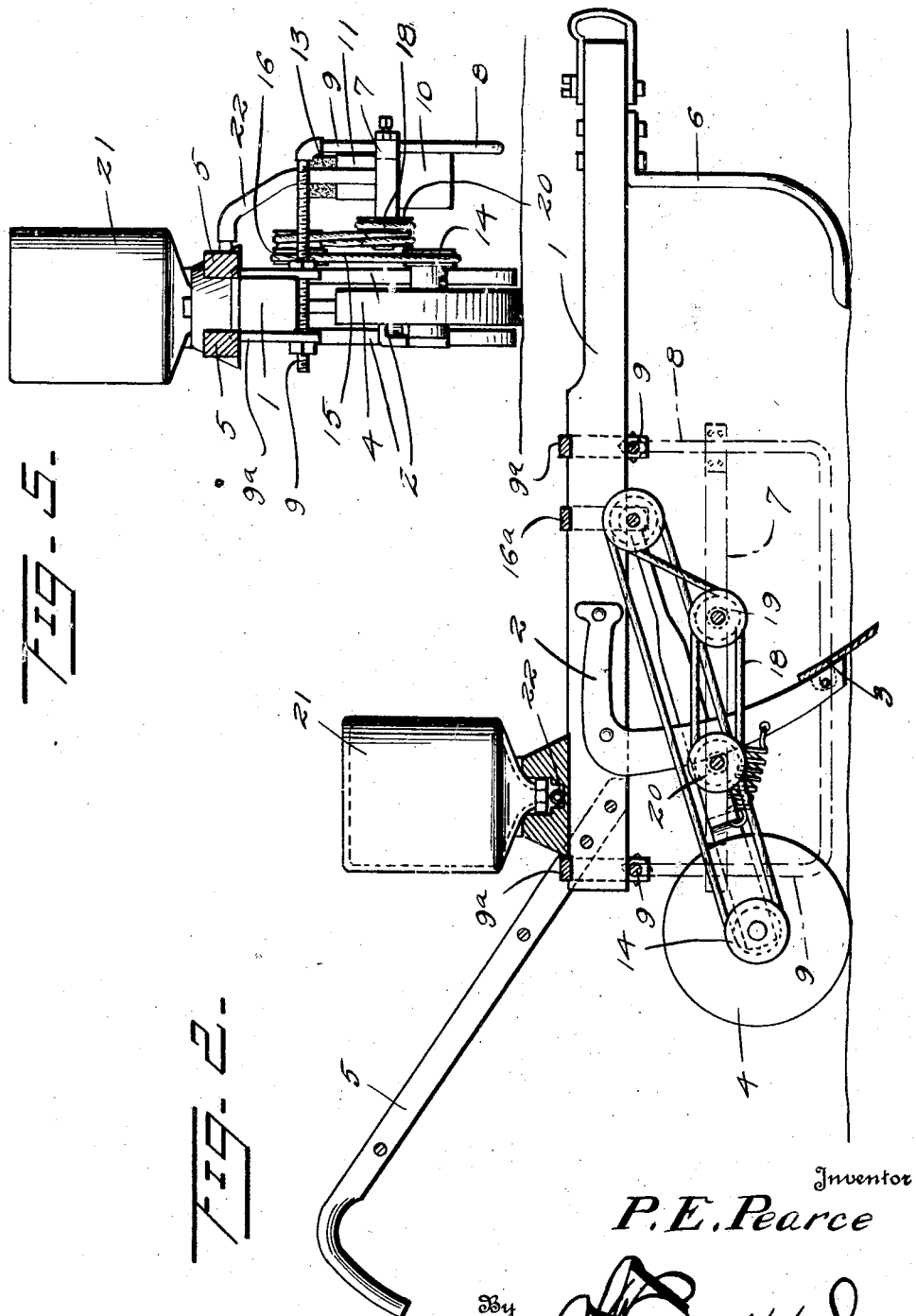

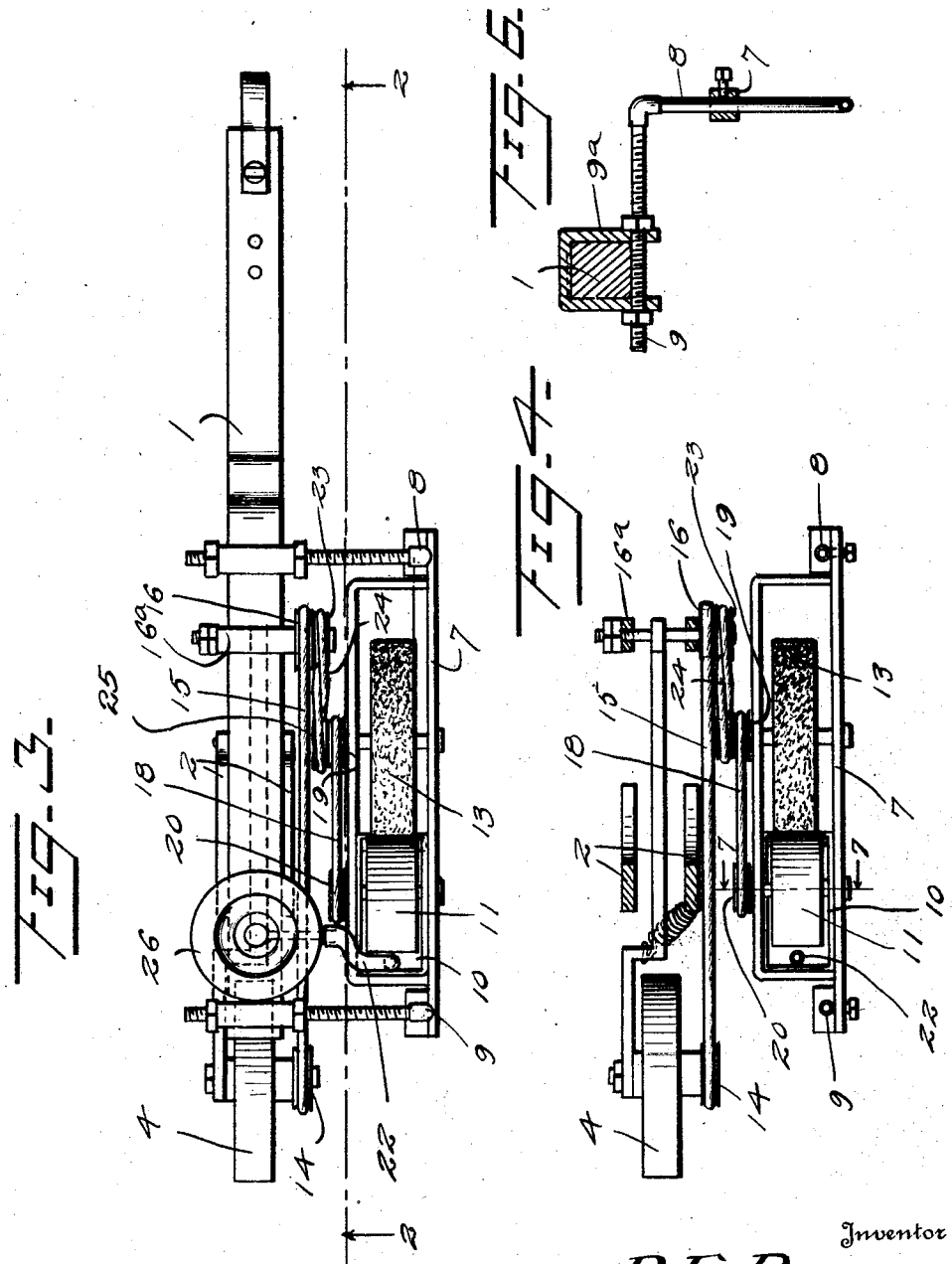

Patented Aug. 25, 1925.

1,551,327

UNITED STATES PATENT OFFICE.

PHILLIP E. PEARCE, OF AMERICUS, GEORGIA.

BOLL-WEEVIL EXTERMINATOR.

Application filed March 5, 1924. Serial No. 697,079.

*To all whom it may concern:*

Be it known that I, PHILLIP E. PEARCE, a citizen of the United States, residing at Americus, in the county of Sumter and State of Georgia, have invented certain new and useful Improvements in Boll-Weevil Exterminators; and I do hereby declare the following to be a full, clear, and exact description of the invention, such as will enable others skilled in the art to which it appertains to make and use the same.

The object of this invention is the extermination of the boll weevil and provides a machine which may be utilized for cultivating the cotton plants and at the same time apply an insecticide thereto for destroying the boll weevil which is so destructive to the cotton industry.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention within the scope of the appended claims.

Referring to the accompanying drawings forming a part of the application:

Figure 1 is a side view of a machine embodying the invention,

Figure 2 is a view similar to Figure 1, taken on line 2—2 of Figure 1,

Figure 3 is a top plan view of the machine, the handle-bars and tank being omitted, Figure 4 is a horizontal section on the line 4—4 of Figure 1, Figure 5 is a rear view of the machine, the handlebars being in section, Figure 6 is a sectional view on the line 6—6 of Figure 1, Figure 7 is a sectional detail view on the line 7—7 of Figure 4, and Figure 8 is a detail sectional view on line 8—8 of Figure 1.

Corresponding and like parts are referred to in the following description and designated in the several views of the drawings by like reference characters.

The machine embodies a plow beam 1 and a plow standard 2 provided at its lower end with a shovel, blade or point 3. The machine is mounted upon a wheel 4 and is directed by handlebars 5 attached to the rear portion of the beam 1. A runner 6 coacts with the wheel 4 to support the beam 1 and maintain the same in a predetermined position. A horizontally disposed frame 7 is attached to the beam 1 by means of a hanger and is adjustable vertically and laterally to meet existing conditions. A pan 10 is carried by the frame 7 and a wheel 11 is arranged to operate therein and feed the insecticide to a distributing wheel 12 which is provided with bristles or feathers 13 or like material for taking up the insecticide from the feed wheel 11 and supplying it to the young plants. The hanger comprises a vertically disposed U-shaped portion 8 and horizontal arms 9 which are laterally adjustably connected to the beam 1 by clips 9$^a$. The frame 7 is vertically adjustable on the uprights of the hanger.

A pulley 14 is fast to the axle of the ground wheel 4 so as to rotate with the latter and a drive belt 15 connects the pulley 14 with a pulley 16 mounted upon a stub axle carried by a clip 16$^a$ on the beam 1. A drive belt 18 connects a pulley 19 on the shaft of the distributing wheel 12 with a pulley 20 on the shaft of the feed wheel 11, thereby operating the latter. A pulley 23 rotatable with the pulley 16 is connected by belt 24 to a pulley 25 fast to the shaft of the wheel 12, whereby to drive the distributing wheel in a counter-clockwise direction to apply the insecticide to the bud of the plant by a wiping or mopping action. A tank or reservoir 21 mounted upon the beam 1, contains the insecticide in bulk and supplies the same to the pan 10. The tank or reservoir 21 preferably consists of a jar or large bottle which is inverted and mounted upon a base 26 and to the neck of which is attached a flexible tube 22 which extends into the pan 10, the insecticide in the latter forming a seal to prevent waste and maintain a uniform level of the insecticide so long as the reservoir 21 contains a supply to replace that removed from the pan 10 by the dispensing mechanism embodying the feed wheel 11 and distributing wheel 12.

In practice, the insecticide in liquid form is supplied to the reservoir 21 and passes therefrom through the tube 22 into the pan 10, the level of the insecticide in the pan being determined by the relative position of the delivery end of the tube 9 which is sealed when the insecticide in the pan reaches the same. As the machine is drawn over the field, the feed wheel 11 and the distributing wheel 12 are rotated, the wheel 11 supplying the insecticide to the distributing wheel 12 which removes the same therefrom and supplies it to the plants in the form of a wipe or spray by reason of the rotation of the wheel and the bristles or feathers 13 around the periphery thereof. The hanger 8 forms a protector to the distributing wheel and a support for the machine when at rest to prevent its toppling over laterally.

What is claimed is:

1. In combination with a support, a hanger extending laterally from said support and adjustable relatively thereto, a frame adjustable on said hanger, an insecticide-containing pan on said frame, a feed wheel journaled on said frame and operating in said pan, a rotary brush journaled on said frame and associated with the feed wheel to receive the insecticide therefrom.

2. In combination with a support, a hanger extending laterally from said support and adjustable relatively thereto, a frame adjustable on said hanger, an insecticide-containing pan on said frame, a feed wheel journaled on said frame and operating in said pan, a rotary brush journaled on said frame and associated with the feed wheel to receive the insecticide therefrom, a ground wheel, and a driving connection between the ground wheel and said feed means and rotary brush.

In testimony whereof I affix my signature.

PHILLIP E. PEARCE.